United States Patent [19]

Hartfiel

[11] 4,098,700

[45] Jul. 4, 1978

[54] CLAY-FREE, THIXOTROPIC WELLBORE FLUID

[75] Inventor: Arlynn H. Hartfiel, Houston, Tex.

[73] Assignee: Chemical Additives Company, Houston, Tex.

[21] Appl. No.: 616,561

[22] Filed: Sep. 25, 1975

Related U.S. Application Data

[62] Division of Ser. No. 472,982, May 24, 1974, Pat. No. 3,988,246.

[51] Int. Cl.$^2$ ............................................. C09K 7/02
[52] U.S. Cl. .............................. 252/8.5 A; 252/8.5 C; 252/8.55 R
[58] Field of Search ............. 252/8.5 A, 8.5 B, 8.5 C, 252/8.55 R

[56] References Cited

U.S. PATENT DOCUMENTS

| 2,561,418 | 7/1951 | Ryan | 252/8.5 |
|---|---|---|---|
| 2,813,093 | 11/1957 | Caldwell et al. | 260/233.3 |
| 2,970,140 | 1/1961 | Hullinger et al. | 260/233.3 |
| 3,033,852 | 5/1962 | Paschall | 252/8.5 X |
| 3,319,715 | 5/1967 | Parks | 252/8.5 |
| 3,852,201 | 12/1974 | Jackson | 252/8.5 |
| 3,872,018 | 3/1975 | Alexander | 252/8.5 |
| 3,956,141 | 5/1976 | Walker | 252/8.5 |
| 4,003,838 | 1/1977 | Jackson et al. | 252/8.5 |

*Primary Examiner*—Herbert B. Guynn
*Attorney, Agent, or Firm*—Kenneth H. Johnson

[57] ABSTRACT

A clay-free wellbore fluid having thixotropic properties, good surface handling characteristics and excellent subterranean characteristics such as particle handling gel strength, and low water loss has been devised by the combination of a heteropolysaccharide prepared by the action of bacteria of the genus Xanthomonas on carbohydrates, modified starch and MgO. In some situations a salt of lignosulfonate is added to maintain the desirable properties of the wellbore fluid.

5 Claims, No Drawings

CLAY-FREE, THIXOTROPIC WELLBORE FLUID

This is a division of application Ser. No. 472,982 filed May 24, 1974, now U.S. Patent No. 3,988,246.

BACKGROUND OF THE INVENTION

This invention relates to wellbore fluids, including drilling fluids, completion fluids, workover fluids, packer fluids, that is, all of those fluids which are employed over the course of the life of a well.

Generally wellbore fluids will be either clay-based or brines which are clay-free. These two classes are exclusive, that is, clay-based drilling fluids are not brines. A wellbore fluid can perform any one or more of a number of functions. For example, the drilling fluid will generally provide a cooling medium for the rotary bit and a means to carry off the drilled particles. Since great volumes of drilling fluid are required for these two purposes, the fluids have been based on water. Water alone, however, does not have the capacity to carry the drilled particles from the borehole to the surface.

In the drilling fluid class, clay-based fluids have for years preempted the field, because of the traditional and widely held theory in the field that the viscosity suitable for creating a particle carrying capacity in the drilling fluid could be achieved only with a drilling fluid having thixotropic properties, that is, the viscosity must be supplied by a material that will have sufficient gel strength to prevent the drilled particles from separating from the drilling fluid when agitation of the drilling fluid has ceased, for example, in a holding tank at the surface.

In order to obtain the requisite thixotropy or gel strength, hydratable clay or colloidal clay bodies such as bentonite or fuller's earth have been employed. As a result the drilling fluids are usually referred to as "muds." The use of clay-based drilling muds has provided the means of meeting the two basic requirements of drilling fluids, i.e., cooling and particle removal. However, the clay-based drilling muds have created problems for which solutions are needed. For example, since the clays must be hydrated in order to function, it is not possible to employ hydration inhibitors, such as calcium chloride, or if employed, their presence must be at a level which will not interfere with the clay hydration. In certain types of shales generally found in the Gulf Coast area of Texas and Louisiana, there is a tendency for the shale to disintegrate by swelling or cracking upon contact with the water if hydration is not limited. Thus the uninhibited clay-based drilling fluids will be prone to shale disintegration.

The drilled particles and any heaving shale material will be hydrated and taken up by the conventional clay-based drilling fluids. The continued addition of extraneous hydrated solid particles to the drilling fluid will increase the viscosity and necessitated costly and constant thinning and reformulation of the drilling mud to maintain its original properties.

Another serious disadvantage of the clay-based fluids is their susceptibility to the detrimental effect of brines which are often found in drilled formations, particularly Gulf Coast formations. Such brines can have a hydration inhibiting effect, detrimental to the hydration requirement for the clays.

Other disadvantages of clay-based drilling fluids are their (1) tendency to prevent the escape of gas bubbles, when the viscosity of the mud rises too high by the incidental addition of hydratable material, which can result in blow-outs; (2) the need for constant human control and supervision of the clay-based fluids because of the exceptable, yet unpredictable, variations in properties; and (3) the formation of a thick cake on the internal surfaces of the wellbore.

The brines have the advantage of containing hydration inhibiting materials such as potassium chloride, calcium chloride or the like. Quite apparently any solid particulate material would be easily separated from the brine solution since it is not hydrated. Thus, the properties of the brine are not changed by solid particulate matter from the wellbore. Similarly, since there is no opportunity for gas bubbles to become entrapped, blow-outs are less likely in a clay-free brine-type wellbore fluid.

Non-argillaceous (clay-free) wellbore fluids based on non thixotropic viscosifiers have been developed, which overcome the problems noted above with the clay-based fluids, such as a brine containing a viscosifying amount of magnesia stabilized hydroxyethyl cellulose described in detail in the copending application of Jack M. Jackson, Ser. No. 343,288 filed Mar. 21, 1973.

Thus, although these two principal water-based, competing and incompatible systems are commercially available and used, there is yet a hiatus, in a manner of speaking, between the capacities and desirable properties of these two systems. Thus, even though the clay-free systems described avoid the problems of the clay-based systems, they are not suitable for systems where weighting materials such as calcium carbonate are necessary or desired, especially if the weighting material is used in substantial quantities.

A material which has come into expanding use in wellbore fluids is heteropolysaccharide produced by the action of bacteria of the genus Xanthomonas on carbohydrates, such as described in U.S. Pat. Nos. 3,198,268; 3,208,526; 3,251,417; 3,243,000; 3,305,016; and 3,319,715. This material has been employed for a number of functions in wellbore fluids, e.g. fluid loss additive, foaming agent, and viscosifier. Generally these heteropolysaccharides are employed with clays; however, they need not be, and in U.S. Pat. No. 3,319,715 they are disclosed to be useful in brine completion fluids.

It is a feature of the present invention that the heteropolysaccharides produced by the action of the genus Xanthomonas bacteria is employed as a thixotropic viscosifier in a clay-free wellbore fluid in conjunction with a specified class of water loss control additives having improved down hole properties, and which can contain weighting materials. These and other features and advantages will be apparent from the following discussion and description of the invention and the preferred embodiments.

SUMMARY OF THE INVENTION

It has been found that an improved clay-free wellbore fluid having thixotropic gel properties for use in subterranean formations in the earth is comprised of water, a viscosifying amount of a heteropolysaccharide produced by the action of bacteria of the genus Xanthomonas on carbohydrates, a stabilizing amount of MgO, an organic starch derivative and a brine forming soluble salt. The present invention also relates to a dry mix additive package for use in aqueous non-argillaceous brine wellbore fluids comprising an intimate mixture.

The materials in said dry mix to provide 0.72 to 7.14 grams of heteropolysaccharide prepared by the action of bacteria of the genus Xanthomonas on carbohydrates; 0.50 to 15 grams of MgO and 0.15 to 30 grams of organic starch derivative per liter of wellbore fluid or more preferably 0.72 to 3.57 grams, 1.0 to 7.0 grams, and 0.9 to 12 grams per liter, respectively.

A further aspect of the present invention is the method of employing the previously described wellbore fluid.

DETAILED DESCRIPTION OF THE INVENTION

The heteropolysaccharides are those produced as generally described in the aforementioned patents which are incorporated herein. The heteropolysaccharides are commercially available. Methods for the preparation are also described in the following references: an article by J. G. Leach, V. G. Lilly, H. A. Wilson and M. R. Purvis, Jr., entitled "The Nature and Function of the Exudate Produced by *Xanthomonas phaseoli,*" which appeared in Phytopathology, volume 47, pages 113 through 120 (1957); an article by V. G. Lilly, H. A. Wilson and J. G. Leach entitled "Bacterial Polysaccharides II: Laboratory-Scale Production of Polysaccharides by Species of Xanthomonas," which was published in Applied Microbiology, volume 6, pages 105 through 108 (1958); a paper by R. F. Anderson, S. P. Rogovin, M. C. Cadmus and R. W. Jackson, "Polysaccharide Production by *Xanthomonas campestris,*" presented at the 136th National Meeting of the American Chemical Society in Atlantic City, N.J., on Sept. 14–18, 1959; and a paper by A. R. Jeanes, J. E. Pittsley, J. H. Sloneker and F. R. Senti, "Composition and Properties of a Heteropolysaccharide Produced From Glucose by *Xanthomonas campestris* NRRL B-1459," which was delivered at the 136th National Meeting of the American Chemical Society in Atlantic City, N.J., on Sept. 14–18, 1959.

A typical heteropolysaccharide material is produced by the action of *Xanthomonas campestris* NRRL B-1459 upon carbohydrates. The purified product can be characterized as a soft, bulky powder having a slight tint, which swells rapidly in the presence of small quantities of water and dissolves in larger quantities. Generally from 0.72 to 7.14 grams of the heteropolysaccharide are dissolved per liter of wellbore fluid and more preferably 0.72 to 3.57 grams per liter. Amounts less than 0.72 grams per liter (0.25 pounds per barrel) are ineffective to provide the necessary thioxtropic properties in the fluid. Amounts above 7.14 grams per liter (2.5 pounds/barrel) render the wellbore fluid too viscous for handling at the surface.

A very important adjunct for use in wellbore fluids containing the heteropolysaccharides is MgO (magnesia) which serves as a stabilizer. Generally only a stabilizing amount of MgO will be employed, e.g., about 0.05 percent by weight based on drilling fluids, which is about 0.50 grams per liter of wellbore fluid (.188 pounds/barrel). The MgO is only very slightly soluble in the brine under the conditions presented here, about 10 ppm of magnesium ion concentration. Hence, the MgO is employed in quantities substantially greater than its solubility. The use of larger amounts of MgO is not harmful, but generally no more than about 15 grams per liter of wellbore fluid is employed. MgO could of course be employed in larger quantities as indicated below as a weighting material should the cost be justifiable. Preferably for stabilization the MgO will be employed in the range of 1.0 to 7.0 grams per liter of wellbore fluid.

The term "organic derivative of starch" or "organic starch derivative" means amylaceous substances which have been modified, for example, by etherification of esterification.

Starch has been employed in both clay-free brine and clay-based wellbore fluids to aid in water loss control and under certain limited conditions it has been effective. However, in clay-free brine wellbore fluids serious drawbacks have been observed with starches. At temperatures around 300° F. fluid loss control is abrogated; that is, the starch no longer provides any fluid loss control.

Another area where starches have proved unsatisfactory is in clay-free brine completion fluids, workover fluids and the like, where acid (generally HCL) is employed. The problem arises because the starches are not sufficiently acid soluble. This problem is particularly serious in injection wells where the insoluble starch can create pockets or block strata which the acid will not leach out, thus resulting in irregular injection into the formation when the well is employed for that purpose.

A particular problem encountered in using starch in clay-free brine wellbore fluids is the instability of the starches in the presence of calcium chloride brines. Generally, the starches begin to break down after about 24 hours in the presence of calcium chloride.

Starch may undergo retrogradation which is a spontaneous tendency to associate and partially crystallize. The associated particles may precipitate and there appears to be a reverting to original cold water insolubility.

Thus although starches have been employed in clay-based fluids, they have generally not been successfully employed with the brine wellbore fluids. It is not surprising to note that the art has grouped all starches together and have considered the starch derivatives as no better or substantially equivalent to unmodified starches. Thus in U.S. Pat. No. 3,032,498 a cyanoethylated starch was described, a water loss reduction additive, which is not in itself surprising; what is unfortunate is the exclusion of brine-type fluids and the further compounding of this error by explicit statements that there must be a thin impervious layer formed on the walls of the borehole by the clay-based mud. The amylaceous substances from which the present modified starches are prepared may be derived from any source, including corn, wheat, potato, tapioca, waxy maize, sago, rice, grain sorghum and arrowroot. It has been found that, whereas ordinary unmodified starch has the disadvantages previously shown, the derivative starches of the present invention are far superior and not so disadvantaged for use in wellbore fluids. The mechanism for this unexpected superiority of the present modified starches is not presently known with certainty. However, a possible explanation for the surprising performance of the derivative starch is that the derivative group makes the starch molecule more bulky and less prone to crystalline structure, i.e., the stereospecific arrangement of the starch molecule may have been disarranged so that the derivative starch is atactic.

The derivative modified starches of the present invention may be added to the wellbore fluid in either the gelatinized or ungelatinized form. Pregelatinization is not necessary. The present modified starches provide fluid loss control and all of the improvements noted herein, when employed in either gelatinized or ungelatinized form.

The wellbore fluids concerned in the present invention are those typically known as "brines." As the term brine is employed here it means at least 1% by weight of soluble salt of potassium, sodium or calcium in water. In addition, the brine may contain other soluble salts of, for example, zinc, chromium, iron, copper and the like. Generally, the chlorides are employed because of availability, but other salts such as the bromides, sulfates and the like can be used. The soluble salts of the brine not only furnish weighting material by adjusting the density of the solution, but also typically furnish the cations for inhibiting the fluid against hydration of solid materials.

The modified starches are preferably employed in an amount which will provide the maximum fluid loss reduction and beyond which additional derivative starch has little additional effect. This amount will vary not only as a result of the other components of the brine but also as a function of the subterranean formation in which it is employed. As a general observation, it has been found that the fluid loss reduction is obtained with starch derivative present in at least an amount in the range of about 0.15 to 30 grams per liter of the wellbore fluid. More preferably, at least an amount of starch derivative in the range of 0.9 to 12 grams per liter of wellbore fluid would be employed.

The minimum amounts specified here for the derivative starch are essential if the benefits of the present invention are to be fully received and the range of amounts is a minimum range, that is, the minimum amount may vary within the range depending on the nature of the wellbore fluid, e.g., concentration of salts, other additives, etc., the use to which fluid is to be put, the condition to be encountered in use, the nature of the formation and the like. Generally the optimum amount of derivative starch will fall in these ranges; however, excess amounts of derivative starch may be employed without detriment. Economic considerations will normally determine an upper limit. It is a unique property of the non-clay based wellbore fluids that rather large excesses of starch can be tolerated without any significant effect on the properties of the wellbore fluid. This is not the case with clay-based drilling fluids, where the fluid is physically crowded by the clay particles and the addition of starch for water loss control, for example, can appreciably increase the viscosity of the fluid.

Numerous derivatives of starch have been described in the art. Their synthesis and properties are outlined in detail in hundreds of papers and patents. An excellent and relatively recent compilation of much of this information is presented in "Starch and Its Derivatives," 4th Ed., J. A. Rodley, Chapman and Hall Ltd.; London 1968. The particular method of preparation is not of interest here and forms no part of this invention insofar as the derivative product.

Included among the suitable organic derivatives of starch are etherified starch, esterified starch and partially oxidized starch.

Some particular etherified starches would include alkylated ethers, prepared for example by treating the starch with an alkyl sulfate and alkali to convert the free hydroxy groups to alkoxyl producing, e.g., a methyl or ethyl ether derivative. Other types of ethers such as hydroxyethylated starch, prepared by mixing starch with dry powdered sodium hydroxide, aging, followed by treatment with ethylene oxide are included. Similarly carboxyalkyl ethers such as carboxymethyl ether of starch prepared by the action of chloroacetic acid on starch in the presence of alkali; sulfur containing ethers such as those taught in British Pat. No. 895,406 and the phosphorus analogues are suitable. The so-called "cationic" nitrogenous starch ethers such as the derivative from the reaction of starch with the reaction product of epihalohydrin and a tertiary amine or the amine salts in the presence of strongly alkaline catalysts are also suitable for the present invention. Other nitrogenous starch ethers include the cyanoalkyl ethers produced by the reaction of starch and acrylonitrile. A further listing of suitable nitrogenous starch ethers is described, for example, in U.S. Pat. Nos. 2,813,093; 2,842,541; 2,894,944; 2,917,506 and 2,970,140.

A broadly applicable method of ether preparation for a large number of suitable ethers was disclosed by Graver et al in U.S. Pat. Nos. 2,671,779; 2,671,780 and 2,671,781, which briefly involved the reaction of an alkalinated starchate with an organic halogen compound.

A particularly preferred class of starch derivatives are starch ethers of the general formula

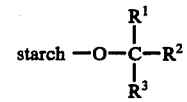

where $R^1$ is $CH_2OH$, or H; $R^2$ is hydrocarbyl or H; $R^3$ is hydrocarbyl, H, COOH, $CH_2R^4OH$, or $NR^5R^6$; $R^4$ is hydrocarbyl; $R^5$ and $R^6$ are H or hydrocarbyl. Generally each hydrocarbyl group has from 1 to 8 carbon atoms and is alkyl, cycloalkyl, aryl, alkaryl or aralkyl. Most preferably, the hydrocarbyl groups are alkyl of 1 to 6 carbon atoms. Each hydrocarbyl is independently selected.

The starch esters may be generally prepared by treating the starch with an organic acid, acid anhydride or acid chloride in presence of an alkaline catalyst such as a tertiary amine or an alkali hydroxide. Specifically water soluble starch formate, starch acetate, starch benzoate and the like have been prepared as well as mixed starch esters such as acetate-butyrate and acetate-formate.

The partial oxidation of starches, for example, with nitric acid introduces carboxyl and carbonyl groups into the starch to produce suitable organic starch derivatives for use in this invention.

Many of the organic starch derivatives described above are commercially available and have been used in the past as sizing agents for paper and cloth or for other purposes. It should be appreciated that the present starch derivatives are as varied as the starch starting materials and suitable derivative starches for this invention may have number average molecular weights of from 20,000 to several hundred thousands, e.g., 400,000–600,000.

It is apparent that since there are multiple sites available for esterification and/or etherification on the starch molecule that there may be from one to several ester or ether functions on a single starch molecule. Thus the chemically modified starches may contain up to the theoretical value of substituent groups or components thereof, based on the glucose units available or may contain only a fractional portion of functional groups based on available sites. Similarly the starches may be cross linked by the use of di- or trifunctional esterification or etherification agents. Within the limits previously given, all such normal and obvious variants of the chemically modified starch are within the scope of the present invention. It is also within the present invention to employ mixtures of starch derivatives, i.e., different ethers or mixtures of ethers and esters and partially oxidized starches.

In addition to soluble brine salts and heteropolysaccharides, MgO and modified starches, the present wellbore fluids can contain other conventional wellbore additives, such as oil for producing water-in-oil or oil-in-water emulsions, viscosifiers such as hydroxyethyl cellulose, gums, and the like, lignosulfonate salts such as calcium or chromium lignosulfonates, emulsifiers, weighting agents, calcium carbonate, magnesia and other agents. It is understood that not all of these possible constituents will be present in any one wellbore fluid but their selection and use will be governed by other constituents and the use for which the wellbore fluid is intended.

In a particular embodiment a powdered weighting agent is incorporated in the wellbore fluid. The term "powdered weighting agent" is used herein and in the claims to describe all such materials known to the prior art of well working fluids as weighting agents, such as barium sulfate (barite or barytes) $BaSO_4$, the various lead oxides, chiefly litharge (PbO) and red lead ($Pb_3O_4$), the iron ores or iron oxides, chiefly magnetite ($Fe_3O_4$) and hematite ($Fe_2O_3$), and powdered iron and lead or other powdered heavy metals and their solid or other water insoluble, stable compounds, such as calcium carbonate.

The various components may be added to a wellbore fluid as individual components or may be preblended as a dry ready mix additive package or packages in such proportions that the relative amounts of each component will be within the ranges recited above in the fluid.

SPECIFIC EMBODIMENTS

Examples 1-4

In this series of runs the improvement in fluid loss characteristics of the brine solutions with the three essential additive components is demonstrated. A dry blend of the components was prepared and added to the brine stirred for 5 minutes at room temperature and immediately hot rolled at 175° F. for 18 hours, cooled, stirred 5 minutes and subjected to API filter loss test (100 p.s.i. differential for 30 minutes). The brine was a $CaCl_2$ brine weighing 11.3 lbs. per gallon. The composition and test results are given below in Table I.

TABLE I

| EXAMPLE | 1 | 2 | 3 | 4 |
|---|---|---|---|---|
| Dry Mix Components | | | | |
| heteropolysaccharide | | | | |
| (X-C Polymer[1]) ppb | 0.7 | 0.7 | 0.7 | 0.7 |
| MgO, ppb | — | 0.7 | — | 0.7 |
| Modified Starch | | | | |
| (HAMACO 267)[2] ppb | — | — | 1.4 | 1.4 |
| Hot Rolled 16 hr. at 175° F. and Tested | | | | |
| Test Temp. ° F. | 73.5 | 73.5 | 73.5 | 73.5 |
| Viscosity (Fann) | | | | |
| Apparent Viscosity cp. | 9.8 | 15 | 13 | 19.3 |
| Plastic Viscosity cp. | 8.5 | 10.5 | 10 | 14 |
| Yield Point lb/100 sq. ft. | 2 | 9 | 6 | 10.5 |
| pH | 5.5 | 8.0 | 5.2 | 7.9 |
| API Filtrate, ml | 74 | 12 | 44 | 8.5 |

[1]Commercial product of Kelco Co., Calif., produced by fermentation of carbohydrate with a genus *Xanthomonas* bacteria
[2]Hyroxypropyl ether corn starch product of A. E. Staley Manufacturing Co., nonionic pregelatinized, D. S. between 0.2 and 2.0

Examples 5-8

In these examples two types of modified starches are compared in a fluid which is loaded with a weighting material. A decline in the water loss efficiency for one type of modified starch was observed; however, this was overcome by the addition of calcium lignosulfonate. A dry blend of the components was prepared and added to a $CaCl_2$ brine weighing 11.3 pounds per gallon. This mixture is aged for one hour at room temperature. Then the weighting material is added, stirred for 5 minutes and tested. The compositions and test results are given in TABLE II.

TABLE II

| EXAMPLE | 5 | 6 | 7 | 8 |
|---|---|---|---|---|
| Dry Mix Components | | | | |
| heteropolysaccharide | | | | |
| (X-C Polymer) ppb | 0.875 | 0.875 | .75 | .75 |
| MgO | 0.875 | 0.875 | 1.61 | 1.61 |
| Modified Starch ppb | | | | |
| (HAMACO 267) | — | 5.25 | 4.50 | — |
| (CATO 15)[1] | 5.25 | — | — | 4.50 |
| Ca Lignosulfonate, ppb | — | — | 5.14 | 5.14 |
| Weighting Material | | | | |
| $CaCO_3$ ppb | 267 | 267 | 267 | 267 |
| Hot Rolled 42 hours at 175° F, cooled to room temp, stirred 5 min., tested | | | | |
| Test Temp. ° F. | 71 | 71 | 71 | 71 |
| Viscosity | | | | |
| Apparent vis. cp. | 76.8 | 84 | 125.5 | 95 |
| Plastic vis. cp. | 63.5 | 55.5 | 106 | 80 |
| Yield Point lb/100 sq. ft. | 26.5 | 47 | 29 | 30 |
| gels 0/10 minutes | 3/6.5 | 9/12 | 2/6 | 1/6 |
| pH | 8.5 | 8.6 | 8.5 | 8.5 |
| API Filtrate, ml. | 1.0 | 156 | 3.9 | 1.2 |
| High Temp. High Pressure Filtrate (250° F - 500 psi differential) | | | | |
| ml | 8.1 | — | 8.7 | 10.5 |

[1]Amino ether corn starch, National Starch and Chemical Corp., cationic, DS between 0.2 and 2.0

Examples 9-12

These examples demonstrate that the effect of "green" cement as might be found in wellbore fluids in some situations. It can be seen that the cement caused no substantial detriment to the properties of the fluid. The fluid preparation procedure described above for Examples 5-8 was employed. The brine, however, was a NaCl brine weighing 9.8 pounds per gallon. The compositions and test results are set out in Table III.

TABLE III

| EXAMPLE | 9 | 10 | 11 | 12 |
|---|---|---|---|---|
| Dry Mix Composition | | | | |
| heteropolysaccharide | | | | |
| (X-C Polymer) ppb | 0.875 | 0.875 | 0.875 | 0.875 |
| MgO, ppb | 0.875 | 0.875 | 1.925 | 1.925 |
| Modified Starch | | | | |
| (CATO 15) ppb | 5.25 | 5.25 | 5.25 | 5.25 |
| Ca Lignosulfonate, ppb | — | — | 6.86 | 6.86 |
| Cement | | | | |
| (Portland Type I) ppb | — | 3.0 | — | 3.0 |
| Weighting Material | | | | |
| $CaCO_3$, ppb | 320 | 320 | 320 | 320 |
| Hot Rolled 18 hours at 175° F., cooled, stirred 5 minutes, tested | | | | |
| Test Temp. ° F. | 72 | 72 | 72 | 72 |
| Viscosity | | | | |
| Apparent vis., cp. | 49 | 21.5 | 62 | 73.5 |
| Plastic vis., cp. | 39.5 | 20 | 50.5 | 60 |
| Yield point, lbs/100 sq. ft. | 19 | 3 | 23 | 27 |
| gels 0/10 | 1/2 | ½/1½ | ½/3½ | 2/5 |
| pH | 10.2 | 11.1 | 10.2 | 10.8 |
| API filtrate, ml | 5.0 | 18 | 3.2 | 6.2 |

The invention claimed is:

1. An aqueous clay-free thixotropic wellbore fluid for use in subterranean formations in the earth comprising water, at least 1% by weight of a brine forming soluble salt or mixture of salts of potassium, sodium or calcium, at least about 0.50 grams of MgO, 0.15 to 30 grams of amino ether starch having the formula

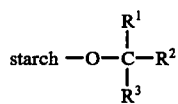

where $R^1$ is H; $R^2$ is hydrocarbyl or H; $R^3$ is $NR^5R^6$ and $R^5$ and $R^6$ are H or hydrocarbyl each of said hydrocarbyl having 1 to 8 carbon atoms and 0.72 to 7.14 grams of a heteropolysaccharide prepared by the action of bacteria of the genus Xanthomonas on carbohydrates and an inorganic insoluble, particulate weighting material.

2. The wellbore fluid according to claim 1 containing 1.0 to 7.0 grams of MgO, 0.9 to 12 grams of amino ether starch and 0.72 to 3.57 grams of heteropolysaccharide per liter of wellbore fluid.

3. The wellbore fluid according to claim 1 wherein said hydrocarbyl is alkyl of 1 to 6 carbon atoms.

4. The wellbore fluid according to claim 1 wherein said weighting material is barium sulfate, lead oxide, iron oxide, powdered iron, powdered lead or calcium carbonate.

5. The wellbore fluid according to claim 1 wherein said weighting material is calcium carbonate.

* * * * *

UNITED STATES PATENT OFFICE
CERTIFICATE OF CORRECTION

PATENT NO. : 4,098,700
DATED : July 4, 1978
INVENTOR(S) : Arlynn H. Hartfiel

It is certified that error appears in the above-identified patent and that said Letters Patent are hereby corrected as shown below:

Column 2, line 5 reads "exceptable" but should read -- expectable --

Column 3, line 62 reads "10 ppm of magnesium ion" but should read -- 100 ppm of magnesium ion --

Column 4, line 6 reads "etherification of" but should read -- etherification or --

Column 4, line 18 reads "HCL" but should read -- HCl --

Column 5, line 53 reads "Rodley" but should read -- Radley --

Column 8, line 39 reads "demonstrates that the" but should read -- demonstrates the --

Signed and Sealed this

Second Day of September 1980

[SEAL]

Attest:

SIDNEY A. DIAMOND

Attesting Officer

Commissioner of Patents and Trademarks